United States Patent
Huang et al.

(10) Patent No.: US 10,450,970 B2
(45) Date of Patent: Oct. 22, 2019

(54) DETECTING AND MITIGATING ABNORMAL COMBUSTION CHARACTERISTICS

(71) Applicant: WESTPORT POWER INC., Vancouver (CA)

(72) Inventors: Jian Huang, Surrey (CA); Kevin Lee, Coquitlam (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/568,425

(22) PCT Filed: Apr. 22, 2016

(86) PCT No.: PCT/CA2016/050473
§ 371 (c)(1),
(2) Date: Oct. 20, 2017

(87) PCT Pub. No.: WO2016/168940
PCT Pub. Date: Oct. 27, 2016

(65) Prior Publication Data
US 2018/0112606 A1 Apr. 26, 2018

(30) Foreign Application Priority Data
Apr. 23, 2015 (CA) .................. 2889605

(51) Int. Cl.
*F02D 41/00* (2006.01)
*F02D 35/02* (2006.01)
(Continued)

(52) U.S. Cl.
CPC ....... *F02D 35/027* (2013.01); *F02D 19/0623* (2013.01); *F02D 19/08* (2013.01);
(Continued)

(58) Field of Classification Search
CPC .... F02D 35/023; F02D 35/027; F02D 35/024; F02D 35/028; F02D 19/08; F02D 41/1401; F02D 41/403; F02D 43/04; F02P 5/1527
See application file for complete search history.

(56) References Cited

U.S. PATENT DOCUMENTS

| | | | |
|---|---|---|---|
| 4,478,068 A | 10/1984 | Bonitz et al. | |
| 5,535,722 A | 7/1996 | Graessley et al. | |

(Continued)

FOREIGN PATENT DOCUMENTS

| | | |
|---|---|---|
| CA | 2 609 718 A1 | 2/2008 |
| EP | 1 116 945 A2 | 7/2001 |
| EP | 1 116 946 A2 | 7/2001 |

OTHER PUBLICATIONS

International Search Report and Written Opinion, dated Jun. 28, 2016, for International Application No. PCT/CA2016/050473, 10 pages.

*Primary Examiner* — Hai H Huynh
*Assistant Examiner* — Gonzalo Laguarda
(74) *Attorney, Agent, or Firm* — Seed IP Law Group LLP

(57) ABSTRACT

Premixed engines including dual fuel engines can experience abnormal combustion characteristics including misfire, pre-ignition and knock. A method for detecting and mitigating abnormal combustion in an engine comprises sensing frequency components of an acoustic signal associated with a combustion chamber during a combustion cycle, the frequency components representative of at least one of a normal and an abnormal combustion characteristic; determining an in-cylinder pressure signal as a function of the acoustic signal; calculating as functions of the in-cylinder pressure signal at least one of a knock index, a gross indicated mean effective pressure and a start of combustion timing; detecting the abnormal combustion characteristic is (Continued)

at least one of (a) a misfire event when the gross indicated mean effective pressure is less than a predetermined mean effective pressure value; (b) a pre-ignition event when the start of combustion timing is advanced of a start of ignition timing; and (c) an engine knock event when the knock index is greater than a predetermined knock value; and performing a mitigation strategy for the detected abnormal combustion characteristic.

22 Claims, 4 Drawing Sheets

(51) Int. Cl.
| | |
|---|---|
| *F02D 41/22* | (2006.01) |
| *F02D 19/10* | (2006.01) |
| *F02D 19/06* | (2006.01) |
| *G01M 15/11* | (2006.01) |
| *F02D 19/08* | (2006.01) |
| *F02D 41/14* | (2006.01) |
| *F02D 41/40* | (2006.01) |
| *F02D 43/04* | (2006.01) |
| *F02P 5/152* | (2006.01) |

(52) U.S. Cl.
CPC ......... *F02D 19/105* (2013.01); *F02D 35/024* (2013.01); *F02D 35/028* (2013.01); *F02D 41/0027* (2013.01); *F02D 41/1401* (2013.01); *F02D 41/22* (2013.01); *F02D 41/403* (2013.01); *F02D 43/04* (2013.01); *F02P 5/1527* (2013.01); *G01M 15/11* (2013.01); *F02D 41/0025* (2013.01); *F02D 2041/1432* (2013.01); *F02D 2200/025* (2013.01); *F02D 2200/101* (2013.01); *F02D 2200/1002* (2013.01); *F02D 2200/1015* (2013.01); *Y02T 10/36* (2013.01); *Y02T 10/40* (2013.01)

(56) References Cited

U.S. PATENT DOCUMENTS

| | | | | |
|---|---|---|---|---|
| 6,273,064 | B1* | 8/2001 | Scholl | G01L 23/222 |
| | | | | 123/406.24 |
| 7,594,493 | B2* | 9/2009 | Matekunas | F02D 17/02 |
| | | | | 123/299 |
| 8,078,389 | B2* | 12/2011 | Huang | G01M 15/08 |
| | | | | 123/406.23 |
| 2003/0188714 | A1 | 10/2003 | Yamamoto et al. | |
| 2004/0118557 | A1* | 6/2004 | Ancimer | F02B 1/12 |
| | | | | 166/227 |
| 2006/0054132 | A1* | 3/2006 | Uchiyama | F02D 41/1498 |
| | | | | 123/299 |
| 2008/0035108 | A1 | 2/2008 | Ancimer et al. | |
| 2009/0118989 | A1* | 5/2009 | Padhi | G01L 23/225 |
| | | | | 701/111 |
| 2017/0002786 | A1* | 1/2017 | Glugla | F02P 17/12 |
| 2017/0037798 | A1* | 2/2017 | Bizub | F02D 41/0052 |
| 2017/0211538 | A1* | 7/2017 | Duan | F02P 5/152 |
| 2017/0328334 | A1* | 11/2017 | Sawdon | F02D 13/0223 |

* cited by examiner

DETECTING AND MITIGATING ABNORMAL COMBUSTION CHARACTERISTICS

FIELD OF THE INVENTION

The present application relates to a technique for detecting and mitigating abnormal combustion characteristics in an internal combustion engine.

BACKGROUND OF THE INVENTION

Dual fuel engines are fuelled with two fuels simultaneously. Typically, a dual fuel engine is converted from a diesel engine and can operate in a diesel mode where the engine is fuelled with diesel and in a dual fuel mode where the engine is fuelled with a gaseous fuel and diesel simultaneously. A gaseous fuel is defined herein to be any fuel that is in the gas state at standard temperature and pressure, which in the context of this application is defined to be 20 degrees Celsius (° C.) and 1 atmosphere (atm). Exemplary gaseous fuels include biogas, butane, ethane, hydrogen, landfill gas, methane, natural gas and propane. In the dual fuel mode, the gaseous fuel is the primary fuel from which the engine derives the majority of its power and the diesel functions as a pilot fuel that is compression ignited such that the combustion of the pilot fuel ignites the gaseous fuel.

One distinction between conventional diesel engines and dual fuel engines is that when operating in a dual fuel mode the gaseous fuel is introduced into the intake air system, or intake ports or into the combustion chamber during the intake stroke or early in the compression stroke at relatively low pressure, compared to the pressure of the diesel fuel which is injected into the combustion chamber late in the compression stroke. The gaseous fuel forms a premixed air-fuel charge in the combustion chamber that when ignited burns with a premixed flame. Dual fuel engines often face challenges in controlling abnormal combustion events due to the inherent mismatch between alternative combustion modes of dual fuel operation and conventional diesel engine parameters, such as compression ratio, air flow rate, and combustion chamber geometry, that are optimized for diesel only operation. Three types of abnormal combustion are often encountered in a dual fuel engine: knock, pre-ignition and misfire.

Knock occurs when a large amount of unburned fuel-air mixture ignites spontaneously before the arrival of the propagating flame front from the normal ignition process. Knock can lead to a rapid rise of cylinder pressure and temperature, and strong pressure oscillation can occur within the combustion chamber. If not controlled promptly, knock can damage pistons and/or the cylinder head within a short period of time. Knock is particularly an issue for dual fuel engines because such engines often keep high compression ratios for maintaining the high thermal efficiency for base diesel operation.

Pre-ignition occurs when unburned air-fuel mixture in the combustion chamber is ignited by a heat source other than the normal ignition source (a spark plug or combustion of a pilot fuel), and happens before the normal ignition event. Hot spots such as those caused by carbon deposits on the surface of a combustion chamber are often found responsible for undesired early ignition. Since ignition by hot spots is not controlled by the normal ignition system, it often leads to erratic cylinder pressure change and higher peak cylinder pressure than that under normal conditions.

In comparison to conventional diesel engines, dual fuel engines that have premixed combustion modes are inherently more susceptible to knock and pre-ignition since the fuel is introduced and mixed well before the ignition event thereby increasing the likelihood of knock and pre-ignition, especially for fuels with lower octane numbers. In conventional diesel engines, fuel injection timing is related to ignition timing by a factor called ignition delay, which is the time required for compression ignition to occur in the combustion chamber after the diesel has been injected late in the compression stroke, and this value is typically a small number of crank angle degrees. Compared to premixed engines, conventional diesel engines have significantly less time to mix and to experience knock and pre-ignition.

Misfire can be caused by failed pilot ignition or issues with the air-fuel ratio of the mixture in the combustion chamber, such as the mixture being too lean or too rich. Misfire is a possible sign of fuel system failure, which should be dealt with promptly before causing more severe damage to the engine. The challenge of controlling misfire in a dual fuel engine is different from that for a conventional diesel engine because of the smaller quantities of pilot fuel, compared to when the engine is fuelled only with diesel fuel.

U.S. Pat. No. 4,478,068, issued to Bonitz et al. on Oct. 23, 1984 discloses an internal combustion engine knock sensing method and system that integrates a knocking signal over a measuring window, and then compares the integrated knocking signal with a reference signal to determine whether knocking is occurring. The reference signal is a weighted average of past values of the integrated knocking signal and the current integrated knocking signal. In this technique, knocking is determined to be occurring based on the history of combustion, and cannot be determined during a single combustion cycle solely based on information derived from the single combustion cycle. Furthermore, knocking can only be determined if there is a significant difference between knocking intensity from the current engine cycle and past engine cycles, otherwise minor increases in knocking intensity from cycle to cycle could cause a false positive indication. Severe engine knocking may not be determined when the knocking intensity ramps up slowly from engine cycle to cycle.

The state of the art is lacking in techniques for detecting and mitigating abnormal combustion characteristics. The present method and apparatus provide a technique for detecting abnormal combustion characteristics and performing a mitigation strategy associated with the detected abnormal combustion characteristic in internal combustion engines.

SUMMARY OF THE INVENTION

An improved method for detecting and mitigating abnormal combustion in an internal combustion engine comprises sensing frequency components of an acoustic signal associated with a combustion chamber during a combustion cycle, the frequency components representative of at least one of a normal combustion characteristic and an abnormal combustion characteristic; determining an in-cylinder pressure signal as a function of the acoustic signal; calculating as functions of the in-cylinder pressure signal at least one of a knock index, a gross indicated mean effective pressure and a start of combustion timing; detecting the abnormal combustion characteristic is at least one of (a) a misfire event when the gross indicated mean effective pressure is less than a predetermined mean effective pressure value; (b) a pre-ignition event when the start of combustion timing is advanced of a start of ignition timing; and (c) an engine knock event when the knock index is greater than a predetermined knock value, wherein calculating the knock index comprises weighting abnormal combustion characteristics on a rising edge of the in-cylinder pressure signal more than on a falling edge; and performing a mitigation strategy for the detected abnormal combustion characteristic.

In an exemplary embodiment the method further comprises selectively fuelling the internal combustion engine with a gaseous fuel. The gaseous fuel can comprise at least one of hydrogen, methane, natural gas and propane, and combinations of these fuels. When the internal combustion engine is a dual fuel engine, the method further comprises introducing a pilot fuel to assist with ignition.

When detecting a misfire event, the method can further comprise calculating the predetermined mean effective pressure value as a function of engine operating conditions comprising at least one of engine load and engine speed. When a misfire event is detected, the method can further comprise performing a fuel system check including at least one of determining a quantity of gaseous fuel remaining in a storage vessel; determining a pressure of gaseous fuel in a conduit delivering the gaseous fuel to the internal combustion engine is above a predetermined minimum value; and determining health of a pressure regulating apparatus between the storage vessel and the internal combustion engine by comparing an input pressure with an output pressure.

The start of ignition timing can be equal to one of a sum of a pilot injection timing and an ignition delay, and a spark plug firing event. The method can further comprise calculating a heat release signal associated with the combustion cycle as a function of the in-cylinder pressure signal, and calculating the start of combustion timing as a function of the heat release signal.

The method can further comprise detecting the engine knock event when, instead of the knock index, an average of the knock index is greater than the predetermined knock value. Calculating the knock index can comprise determining a low pass filtered in-cylinder pressure signal; calculating a difference signal defined by the difference between the in-cylinder pressure signal and the low-pass-filtered in-cylinder pressure signal; calculating a positive signal defined as a POS function of the difference signal; and integrating the positive signal over a predefined window during the combustion cycle. The predefined window can be between the start of ignition timing and an end of main combustion phase timing. The end of main combustion phase timing can occur when a cumulative heat release rate reaches a predetermined value.

The mitigation strategy can comprise notifying a diagnostic system of the occurrence of the abnormal combustion characteristic. When the internal combustion engine is a dual fuel engine operable in a single fuel mode and a dual fuel mode, the method can further comprise transitioning to the single fuel mode from the dual fuel mode when at least one of the misfire event, the pre-ignition event and the engine knock event are detected. In an exemplary embodiment, the combustion chamber is one of a plurality of combustion chambers, and the transition to single fuel mode occurs only for respective combustion chambers experiencing the at least one of the misfire event, the pre-ignition event and the engine knock event. When at least one of pre-ignition and knock are detected, the mitigation strategy can be at least one of retarding ignition timing; increasing an exhaust gas recirculation mass flow rate to dilute a gaseous fuel-air mixture to be burned in the combustion chamber; and increasing an intake air mass flow rate to dilute the gaseous fuel-air mixture. The ignition timing can be returned to a calibrated timing after at least one of a predetermined time interval and a predetermined number of engine cycles. Alternatively, or in addition to, the mitigation strategy can comprise changing a proportion of a gaseous fuel compared to a pilot fuel.

An alternative knock mitigation strategy comprises retarding ignition timing across a first plurality of engine cycles in a step-wise fashion when a knock level is greater than a first threshold during the first plurality of engine cycles, until a preset limit is reached; and advancing ignition timing across a second plurality of engine cycles in a step-wise fashion when the knock level is less than the first threshold during the second plurality of engine cycles, until the calibrated ignition timing is reached.

An improved apparatus for detecting and mitigating abnormal combustion in an internal combustion engine comprises an acoustic signal sensor connected with the internal combustion engine for emitting signals representative of vibrational signals associated with combustion and responsive to frequency components representative of at least one of a normal combustion characteristic and an abnormal combustion characteristic; an electronic controller operatively connected with the acoustic signal sensor and programmed to determine an in-cylinder pressure signal as a function of the acoustic signal; calculate as functions of the in-cylinder pressure signal at least one of a knock index, a gross indicated mean effective pressure and a start of combustion timing; detect the abnormal combustion characteristic is at least one of (a) a misfire event when the gross indicated mean effective pressure is less than a predetermined mean effective pressure value; (b) a pre-ignition event when the start of combustion timing is advanced of a start of ignition timing; and (c) an engine knock event when the knock index is greater than a predetermined knock value, wherein calculating the knock index comprises weighting abnormal combustion characteristics on a rising edge of the in-cylinder pressure signal more than on a falling edge; and perform a mitigation strategy for at least one of the detected abnormal combustion characteristics.

DETAILED DESCRIPTION OF PREFERRED EMBODIMENT(S)

Figure 1:
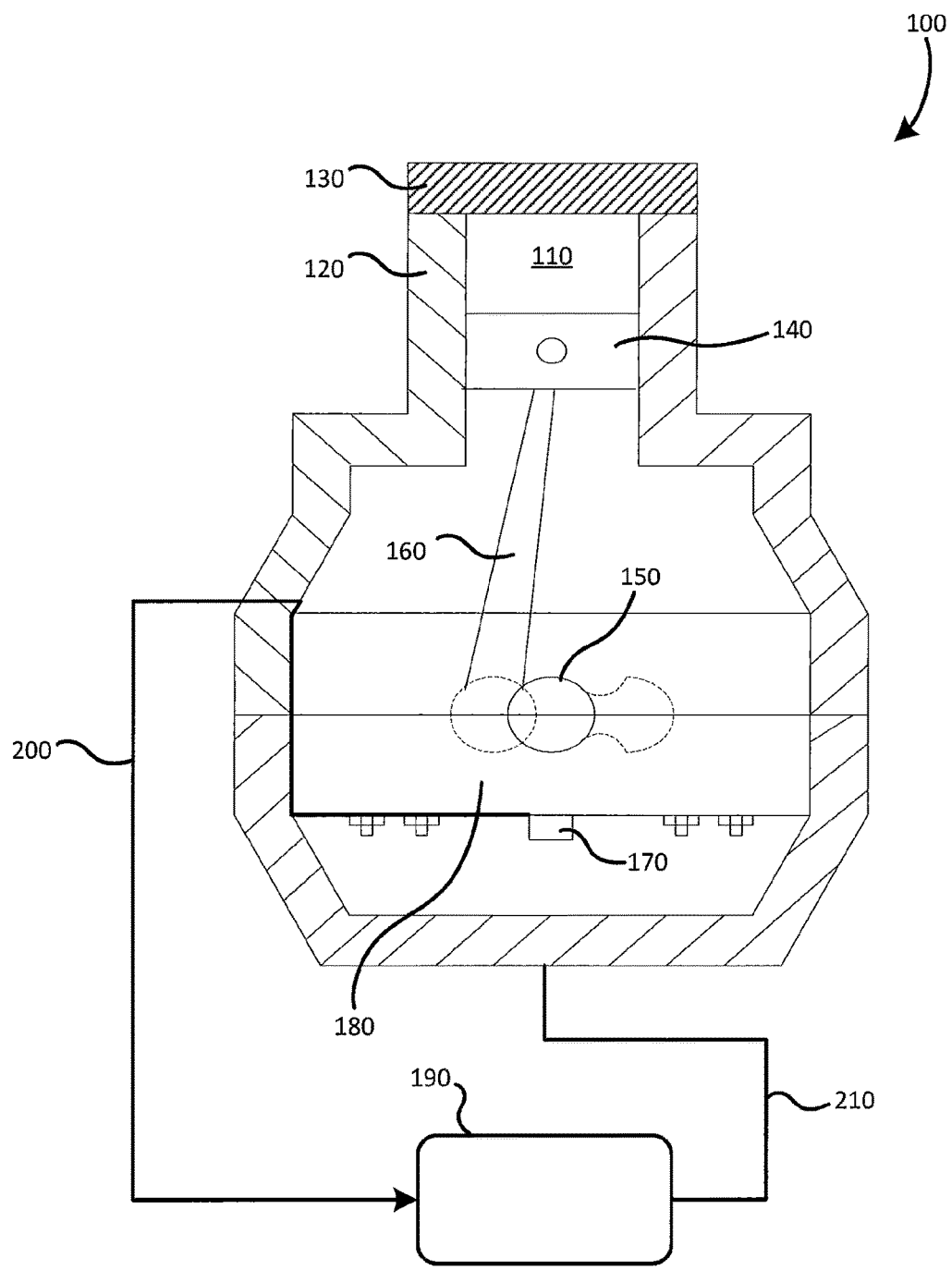
FIG. 1 is a schematic view of an internal combustion engine according to an embodiment.

Referring to FIG. 1, there is shown by way of example internal combustion engine 100 that includes a control system employed to detect abnormal combustion characteristics and to perform mitigation techniques related to the detected combustion characteristic. In an exemplary embodiment engine 100 is a dual fuel engine that is fuelled with a pilot fuel and a gaseous fuel in a dual fuel mode and the pilot fuel in a single fuel mode. Engine 100 comprises combustion chamber 110, which in this example is defined by a cylinder bore in engine block 120, cylinder head 130 and piston 140. Only one such combustion chamber is shown in FIG. 1 although as would be known by those skilled in the technology engine 100 normally comprises two or more combustion chambers, and the technique disclosed herein applies to any engine having one or more combustion chambers. Piston 140 is reciprocable within the cylinder bore, and the reciprocating motion of piston 140 is translated into rotation of crankshaft 150 via connecting rod 160 which is operatively attached at opposite ends to piston 140 and crankshaft 150. Intake and exhaust valves (not shown) operate to deliver charge comprising oxygen from an intake manifold to combustion chamber 110, and to remove exhaust by-products therefrom to an exhaust manifold. Engine 100 further comprises fuel and air delivery systems, and other standard systems associated with internal combustion engines. When engine 100 is a dual fuel engine, the pilot fuel can be directly introduced into combustion chamber 110 and the gaseous fuel can be either directly introduced into the combustion chamber, or can be introduced upstream of the intake valve (not shown).

Engine 100 shows acoustic signal sensor 170 in the form of an accelerometer sensor mounted on bearing cap 180, which acts as a damped oscillator by damping deflections caused by changes in the in-cylinder pressure. Acoustic signal sensor 170 is employed to detect changes in pressure in combustion chamber 110 by way of vibrational signals generated during combustion, and is responsive to frequencies of vibrational signals associated with a normal combustion characteristics and an abnormal combustion characteristics, including misfire, pre-ignition and engine knock. The vibrational signals associated with abnormal combustion characteristics related to pre-ignition and engine knock comprise frequency components that are normal and abnormal. The normal frequency components of the vibrational signal are similar to those found in normal combustion characteristics and are related to deflagration, and as used herein the normal frequency components refer to the frequency components in both normal and abnormal combustion characteristics that are normal. The abnormal frequency components of the vibrational signal are related to detonation. The normal frequency components include a fundamental frequency equivalent to twice the speed of the engine specified in revolutions per minute (rpm) since engine 100 is a four-cycle engine where piston 180 makes two revolutions in every engine cycle, and in other embodiments when the engine is a two-cycle engine the fundamental frequency is equal to the speed of the engine, and allows the normal in-cylinder pressure to be determined. In contrast, the frequencies associated with the pre-ignition and engine knock abnormal combustion characteristics comprise a fundamental frequency that is higher than the fundamental frequency of the normal combustion characteristics, and do not allow the normal in-cylinder pressure to be determined. The bandwidth of conventional knocking sensors can detect frequencies associated with the pre-ignition and engine knock abnormal combustion characteristics, but cannot be employed to determine in-cylinder pressure. As would be known by those skilled in the technology other locations in engine 100 can be employed to mount acoustic signal sensor 170 such that changes in combustion pressure can be detected, and the frequencies associated with normal combustion and abnormal combustion can be sensed by the acoustic signal sensor. Electronic controller 190 receives a time-based acoustic signal representative of in-cylinder pressure from acoustic signal sensor 170 over signal wire 200. When engine 100 comprises a plurality of cylinders the number of knock sensors required depends upon the engine geometry. In a typical engine because adjacent cylinders are normally operated out of phase with respect to each other one such acoustic signal sensor 170 and corresponding signal wire 200 can be associated with an adjacent pair of combustion chambers. As is known to those familiar with the technology, electronic controller 190 receives other signals from other sensors in engine 100, such as engine speed (RPM), crank position, cam position, pedal position, intake manifold pressure (IMP), throttle position sensor, lambda sensor, fuel rail pressure and torque, and the collection of these signals and their input to the controller is represented by signal wires 210. Crank position and cam position are employed to convert the time-based knock sensor signal received by controller 190 to a crank-angle based signal, as will be described in more detail below. Electronic controller 190 comprises modules that are responsive to signals over wires 200 and 210 to detect abnormal combustion characteristics (misfire, pre-ignition, knock) and to perform mitigation techniques selected depending upon the detected abnormal combustion characteristics. As used herein, the terms module, algorithm and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the modules, algorithms and steps herein are part of electronic controller 190.

Figure 2:
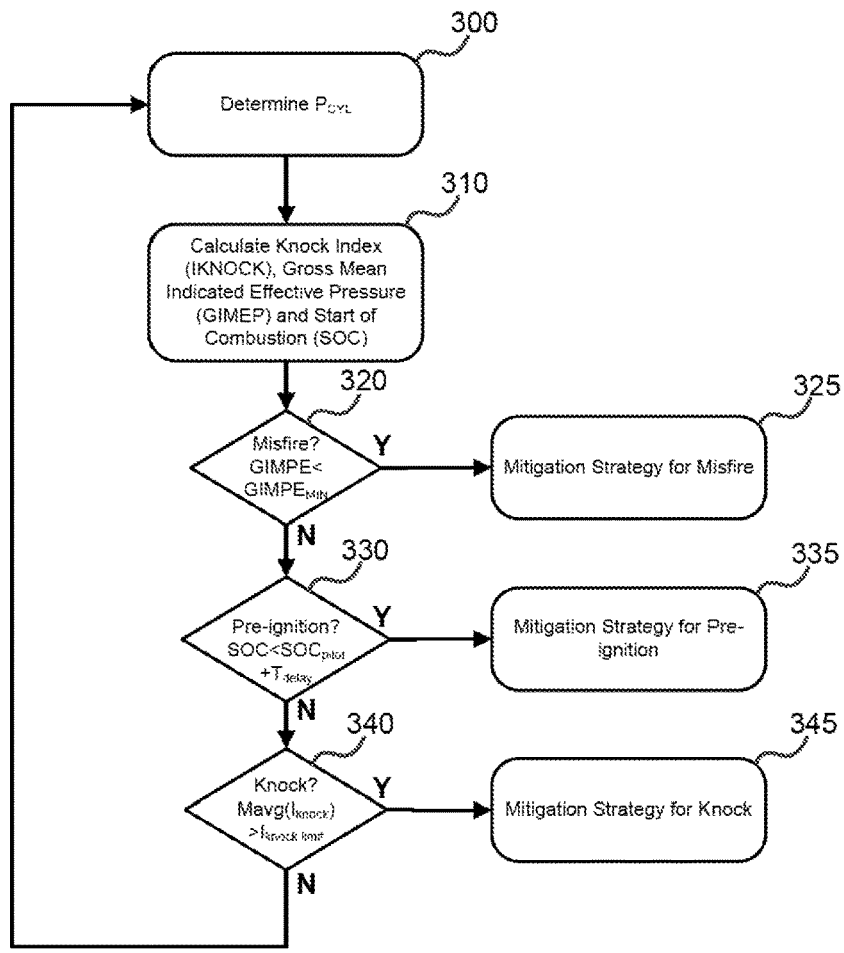
FIG. 2 is a flow chart view of a method for detecting and mitigating abnormal combustion characteristics.

Referring now to FIG. 2, an exemplary embodiment of a method of detecting and mitigating abnormal combustion in internal combustion engine 100 according to a first embodiment is now described. The method detects abnormal combustion characteristics from a plurality of abnormal combustion characteristics such as misfire, pre-ignition and engine knock, and performs a mitigation strategy selected for the particular type of abnormal combustion characteristic detected. The method is performed by controller 190 and is preferably carried out during every combustion cycle of engine 100. In step 300 controller 190 determines an in-cylinder pressure signal ($P_{CYL}$) as a function of the acoustic signal from sensor 170. The acoustic signal can be preconditioned by controller 190, such as filtering out frequencies of the acoustic signal not associated with normal and abnormal combustion characteristics, before reconstructing the in-cylinder pressure signal ($P_{CYL}$). The acoustic signal from sensor 170 is typically a time-based acoustic signal. When controller 190 determines the in-cylinder pressure ($P_{CYL}$) the controller can convert the time-based acoustic signal to a crank-angle based acoustic signal by employing the crank angle and/or cam angle signals accordingly. Unlike conventional techniques that detect abnormal combustion characteristics and in particular those conventional techniques that detect knock, the method disclosed herein employs both the frequency components of normal combustion characteristics and abnormal combustion characteristics in the detection of the abnormal combustion characteristics. The in-cylinder pressure signal ($P_{CYL}$) is referred to as being reconstructed since the pressure in the cylinder is not directly measured, but rather the acoustic signal is employed to indirectly determine the in-cylinder pressure. Various other parameters employed in the remaining steps of the method are calculated in step 310 as a function of the in-cylinder pressure signal ($P_{CYL}$), including a knock index ($I_{KNOCK}$), a gross mean indicated effective pressure (GIMEP) and a start of combustion (SOC) timing. Other parameters such as a peak cylinder pressure and a heat release signal can be calculated in further embodiments. The start of combustion timing can be determined based on the in-cylinder pressure signal ($P_{CYL}$). In other embodiments the heat release signal can be employed to more accurately determine the start of combustion timing.

Steps 320, 330 and 340 detect for a misfire event, a pre-ignition event and an engine knock event respectively. Although these steps are illustrated in sequential order (also known as serial execution) they do not need to be performed sequentially, and can be performed concurrently (also known as parallel execution) in other embodiments. In still further embodiments, steps 320, 330 and 340 can be performed sequentially but in a different order that is illustrated in FIG. 2.

In step 320, controller 190 determines whether the misfire event has occurred, and when it has the method proceeds to step 325 where a mitigation strategy for the misfire event is performed, otherwise the method proceeds to step 330. The misfire event occurs when the gross indicated mean effective pressure is less than a predetermined minimum value $GIMEP_{MIN}$, according to Equation 1 below.

$$GIMPE<GIMPE_{MIN} \qquad \text{Equation 1}$$

The mitigation strategy in step 325 includes logging the misfire event in a diagnostic system in engine 100, such as an on-board diagnostic (OBD) system. When engine 100 is a dual fuel engine, and the misfire event was detected in the dual fuel mode, the mitigation strategy can include transitioning back to the single fuel mode, and if the cylinder continues to misfire in the single fuel mode there could be a problem with the single fuel mode fuelling system. Alternatively, before transitioning back to single fuel mode, the proportion of pilot fuel compared to gaseous fuel can be increased by increasing the commanded amount of pilot fuel to improve pilot ignition, while simultaneously reducing the commanded amount of gaseous fuel to maintain an equivalent amount of total fuel introduced in the combustion chamber on an energy basis as a function of engine operating conditions.

In step 330, controller 190 determines whether the pre-ignition event has occurred, and when it has the method proceeds to step 335 where a mitigation strategy for the pre-ignition event is performed, otherwise the method proceeds to step 340. The pre-ignition event occurs when start of combustion timing is before start of ignition timing for the normal ignition event. That is combustion in the cylinder is occurring before the air-fuel charge in the cylinder is ignited by the ignition technique employed in engine 100. For example, when engine 100 employs a pilot fuel such as diesel that is compression ignited to ignite a main fuel such as natural gas, pre-ignition occurs when start of combustion timing measured in crank angle degrees is before pilot fuel ignition timing measured in crank angle degrees, and which can be calculated as shown in Equation 2 below.

$$SOC<SOI_{pilot}+T_{delay} \qquad \text{Equation 2}$$

The ignition delay value is the amount of time required after the pilot fuel is injected into the cylinder for it to be auto-ignited by the pressure and temperature environment in the cylinder. The mitigation strategy in step 335 includes logging the pre-ignition event in the diagnostic system of engine 100. When engine 100 is a dual fuel engine, and the pre-ignition event was detected in the dual fuel mode, the mitigation strategy can include transitioning back to the single fuel mode. Alternatively, before transitioning back to single fuel mode, the proportion of gaseous fuel compared to pilot fuel can be reduced by decreasing the commanded amount of gaseous fuel to reduce the likelihood of the premixed charge from pre-igniting, while simultaneously increasing the commanded amount of pilot fuel to maintain an equivalent amount of total fuel introduced into the combustion chamber on an energy basis as a function of engine operating conditions. In other embodiments, knock can be mitigated in step 347 by increasing at least one of an exhaust gas recirculation mass flow rate (EGR fraction) and an intake air mass flow rate, both of which act to dilute the air-fuel mixture in combustion chamber 110, resulting in slower flames and cooler combustion temperatures.

In step 340, controller 190 determines whether an engine knock event has occurred, and when it has, the method proceeds to step 345 where a mitigation strategy for the engine knock event is performed, otherwise the method proceeds back to step 300 to begin the method again for the next engine cycle. An engine knock event occurs when a moving average of the knock index is greater than a predetermined knock value, according to Equation 3 below.

$$Mavg(I_{knock})>I_{knock\ limit} \qquad \text{Equation 3}$$

Figure 3:
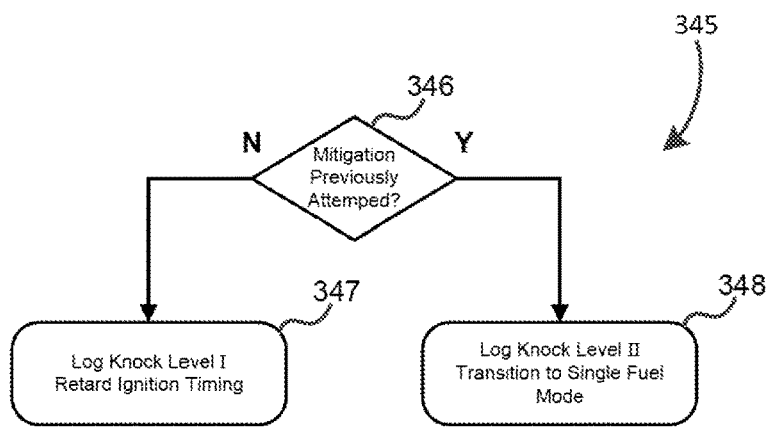
FIG. 3 is a flow chart view of a method of mitigating an engine knock event according to a first embodiment.

A moving average is employed in Equation 3 instead of the instantaneous knock index to avoid detecting and mitigating an occasional occurrence of knock as a low frequency event, although in other embodiments the engine knock event occurs when the knock index is above a predetermined knock value. Alternatively, the engine knock event occurs when a weighted average histogram of the knock index is above the predetermined knock value, and as would be known by those familiar with the technology other statistical techniques can be employed that take into consideration past values of the knock index to determine whether the engine knock event occurred in the current engine cycle. The mitigation strategy in step 345 includes logging the engine knock event in the diagnostic system of engine 100. When engine 100 is a dual fuel engine, and the engine knock event was detected in the dual fuel mode, the mitigation strategy can include transitioning back to the single fuel mode. Alternatively, with reference to FIG. 3, when engine 100 is a dual fuel engine operating in the dual fuel mode, the mitigation strategy in step 345 can include determining whether a mitigation strategy was previously attempted in step 346. When knock is detected and no previous mitigation attempt has been made, the method proceeds to step 347 where a knock level I is logged in the diagnostic system of engine 100, and the ignition timing of the engine is retarded. By retarding the ignition timing the peak cylinder temperature is reduced which can reduce the likelihood of engine knock re-occurring in subsequent engine cycles. The ignition timing can return to normal ignition timing after at least one of a predefined period of time and a predetermined number of engine cycles. Ignition timing is retarded in a dual fuel engine by retarding the introduction of the pilot fuel. In other embodiments, knock can be mitigated in step 347 by increasing at least one of an exhaust gas recirculation mass flow rate (EGR fraction) and an intake air mass flow rate, both of which act to dilute the air-fuel mixture in combustion chamber 110, resulting in slower flames and cooler combustion temperatures. Alternatively, the proportion of gaseous fuel compared to pilot fuel can be reduced by decreasing the commanded amount of gaseous fuel to reduce the likelihood of the premixed charge from knocking, while simultaneously increasing the commanded amount of pilot fuel to maintain an equivalent amount of total fuel introduced into the combustion chamber on an energy basis as a function of engine operating conditions. Returning to step 346, when knock is detected and a previous attempt at mitigating the knock has been performed (in step 347) the method proceeds to step 348 where a knock level II is logged in the diagnostic system and the engine transitions to the single fuel mode.

The knock index $I_{KNOCK}$ is determined according to Equation 4 below, where t1 is the start of combustion timing, t2 is an end of main combustion phase timing, LPF is a low pass filter function operating on the in-cylinder pressure signal and the POS function is defined according to Equation 5 below.

$$I_{KNOCK} = \int_{t1}^{t2} POS(P_{CYL} - LPF(P_{CYL})) \quad \text{Equation 4}$$

$$POS(x) = \begin{cases} x \text{ if } x \geq 0 \\ 0 \text{ if } x < 0 \end{cases} \quad \text{Equation 5}$$

Figure 4:
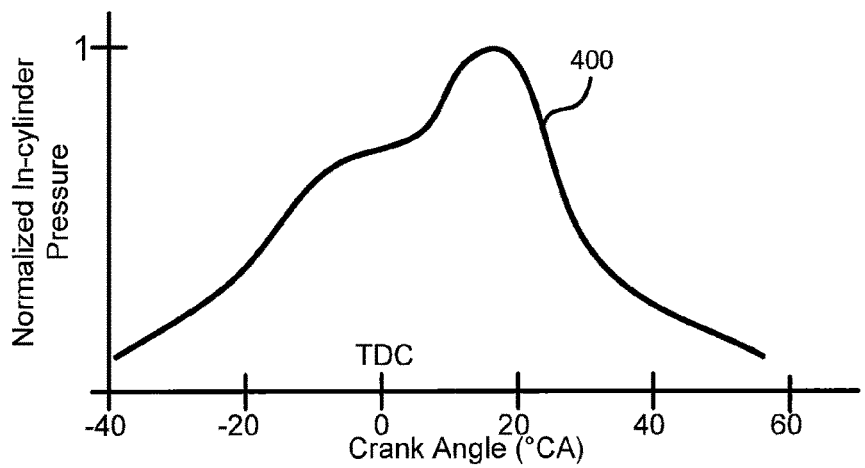
FIG. 4 is a chart view of an in-cylinder pressure signal for a normal combustion characteristic.
Figure 5:
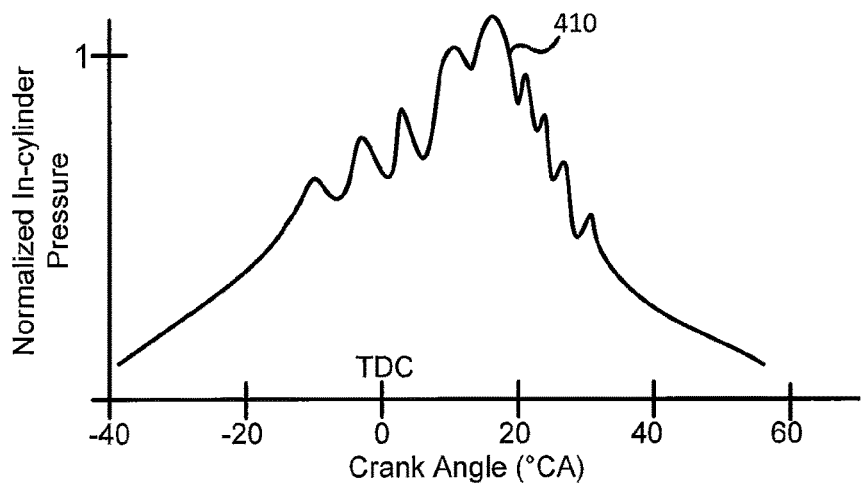
FIG. 5 is a chart view of an in-cylinder pressure signal for an abnormal combustion characteristic including engine knock.
Figure 6:
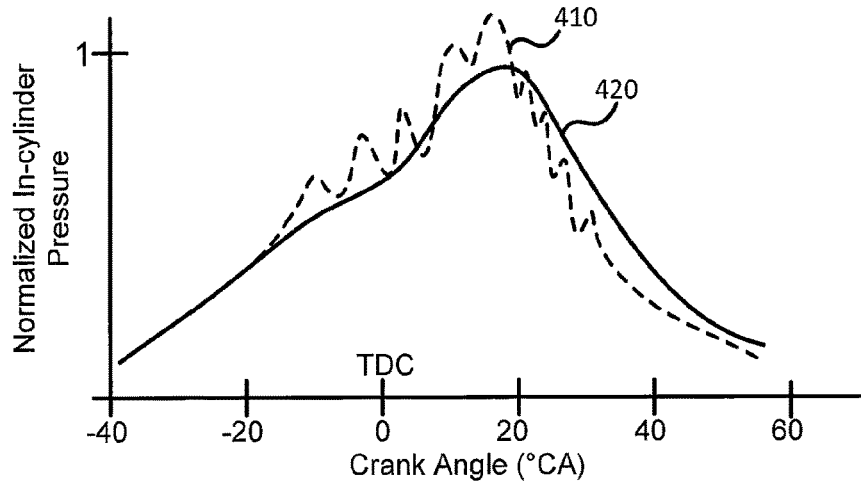
FIG. 6 is a chart view of a low pass filtered in-cylinder pressure signal and the in-cylinder pressure signal of FIG. 5.

The end of main combustion phase timing occurs when the in-cylinder pressure signal occurs when a cumulative heat release rate for the given combustion cycle reaches a predetermined value, and in an exemplary embodiment it reaches 90% of its total value. The technique of determining the knock index according to Equation 4 weights a rising edge of an envelope of the in-cylinder pressure signal more than a falling edge, which can be explained in more detail with references to FIGS. 4, 5 and 6. FIG. 4 illustrates in-cylinder pressure signal 400 that is representative of a normal combustion characteristic. FIG. 5 illustrates in-cylinder pressure signal 410 that is representative of an abnormal combustion characteristic that comprises the abnormal frequency components associated with engine knock and the normal frequency components associated with normal combustion. As is illustrated in FIG. 5, the shape of the in-cylinder pressure signal 410 is similar to the in-cylinder pressure signal 400 in FIG. 4 with a high frequency engine knocking signal superimposed thereon. FIG. 6 illustrates the low pass filtered signal 420 which is the shape of the pressure signal after in-cylinder pressure signal 410 is low-pass filtered. The difference between in-cylinder pressure signal 410 and low pass filtered signal 420 is equivalent to the term (P.sub.CYL-LPF(P.sub.CYL)) in Equation 5, and it can be seen that the difference is typically greater than zero on the rising edge of signal 410 and less than zero on the falling edge of signal 410, and hence Equation 4 weights the rising edge knocking signals more than the falling edge. Engine knock occurring on the rising edge is more dangerous than engine knock occurring on the falling edge since there is increased likelihood that the in-cylinder pressure can exceed the maximum pressure rating of the cylinder when engine knock occurs on the rising edge. Previous techniques that determined when an engine was knocking factored in both the rising edge and falling edge components of engine knock when making the determination, and accordingly engine knock was determined to be happening and mitigation steps taken, where such steps often derate the power output of the engine and/or increase emissions, when it was not necessary.

Figure 7:
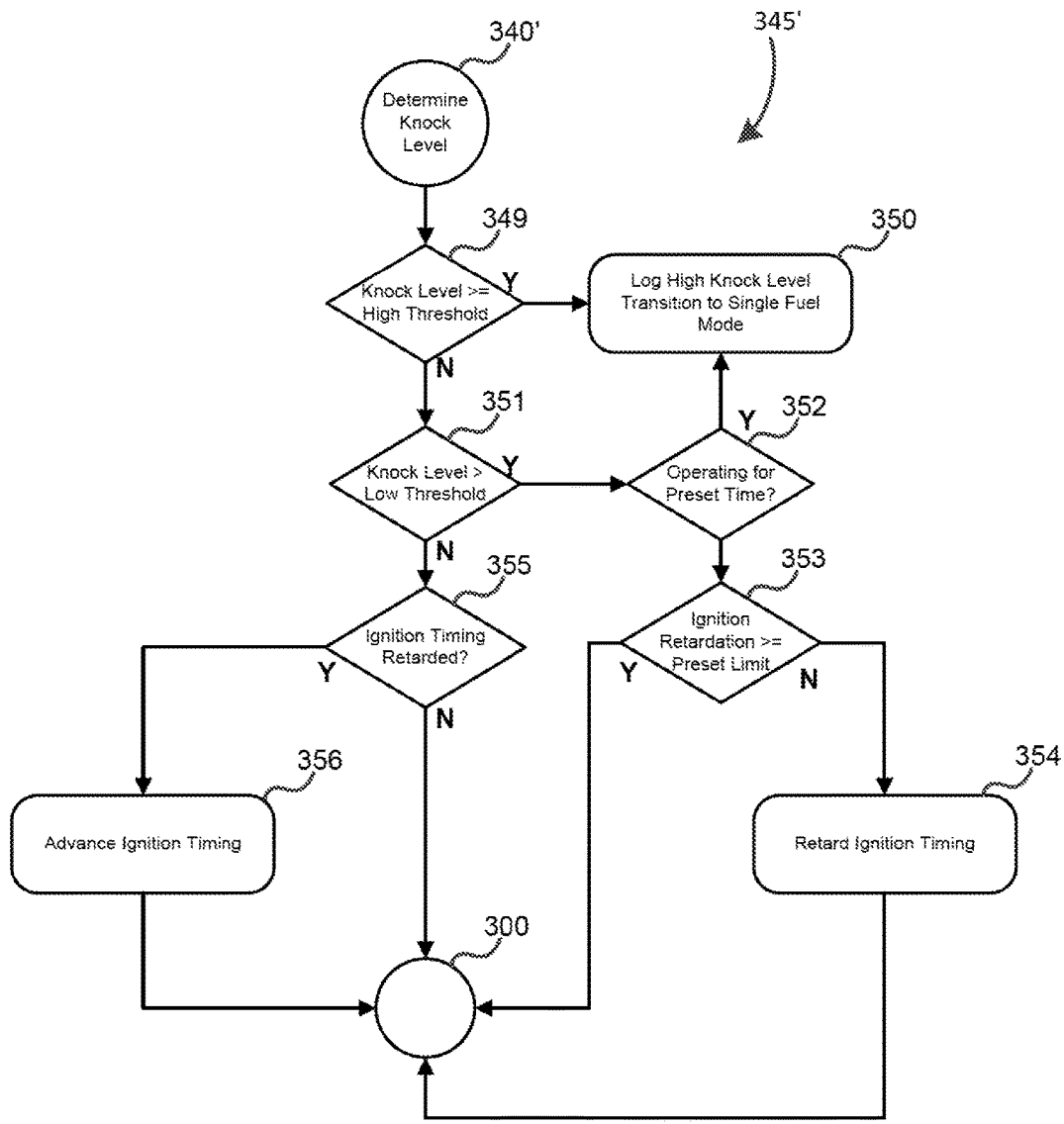
FIG. 7 is a flow chart view of a method of mitigating an engine knock event according to a second embodiment.

Referring now to FIG. 7, knock mitigation strategy 345' is illustrated, which is an alternative embodiment for mitigation strategy 345. Mitigation strategy 345' runs every engine cycle and employs a linear, step-wise retardation of ignition timing in the presence of on-going knock over a plurality of engine cycles (within predetermined thresholds), and when knock is no longer detected the retarded ignition timing returns (that is advanced) to the calibrated value in a linear, step-wise fashion over a plurality of engine cycles. Step 340' determines the level of knock (that is the knock level) and can be carried out instead of step 340 in the method for detecting and mitigating abnormal combustion characteristics illustrated in FIG. 2. The knock level is compared against a high threshold in step 349. When the knock level is above (or equal to) the high threshold the method proceeds to step 350 where a high knock level is logged in the diagnostic system and the engine transitions to the single fuel mode. In step 349, when the knock level is below the high threshold the method proceeds to step 351 where the knock level is compared to a low threshold. When the knock level is above the low threshold the method proceeds to step 352. In step 352 the amount of time that the engine has been operating with the knock level between the low and high thresholds is compared to a preset time. When the engine has been operating with the knock level between the low and the high thresholds for at least the preset amount of time, the method proceeds to step 350 (the event is logged in the diagnostic system and the engine enters single fuel mode). When the preset time criteria is not met the method proceeds to step 353. In step 353, the current amount of ignition retardation (relative to the calibrated ignition timing for the given engine operating conditions) is compared with a preset limit. When the current amount of ignition retardation is at least equal to the preset limit the method proceeds to step 300 (as seen in FIGS. 2 and 7). Otherwise the method proceeds to step 354 where the ignition timing is retarded by the preset step, after which the method proceeds to step 300. Returning now to step 351, when the knock level is below the low threshold the method proceeds to step 355. In step 355, the current ignition timing is compared to the calibrated ignition timing (for the given engine operating conditions). When the current ignition timing is retarded compared to the calibrated ignition timing the method proceeds to step 356, otherwise the method proceeds to step 300. In step 356, the ignition timing is advanced by the preset step, after which the method proceeds to step 300. In an exemplary embodiment the preset step value is substantially between 0.5 and 1.0 crank angle degrees, and the preset limit value is substantially 3.0 crank angle degrees. However, the preset step and the preset limit are dependent upon the engine platform and application, and in other embodiments they can be different than the values disclosed herein. Torque disturbances are reduced by retarding and advancing the ignition timing in a linear, step-wise fashion, with a relatively small step value.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for detecting and mitigating abnormal combustion in an internal combustion engine comprising:
    sensing frequency components of an acoustic signal associated with a combustion chamber during a combustion cycle;
    determining an in-cylinder pressure signal as a function of the acoustic signal;
    calculating a knock index as a function of the in-cylinder pressure signal;

detecting the abnormal combustion characteristic is:
an engine knock event when determining the knock index is greater than a predetermined knock value, wherein calculating the knock index comprises weighting abnormal combustion characteristics on a rising edge of the in-cylinder pressure signal more than on a falling edge; and
performing a mitigation strategy for the detected abnormal combustion characteristic.

2. The method of claim 1, further comprising selectively fueling the internal combustion engine with a gaseous fuel.

3. The method of claim 2, further comprising introducing a pilot fuel to assist with ignition.

4. The method of claim 1, further comprising detecting the engine knock event when an average of the knock index is greater than the predetermined knock value.

5. The method of claim 1, wherein calculating the knock index comprises:
determining a low pass filtered in-cylinder pressure signal;
calculating a difference signal defined by the difference between the in-cylinder pressure signal and the low-pass-filtered in-cylinder pressure signal;
calculating a positive signal defined as a POS function of the difference signal; and
integrating the positive signal over a predefined window during the combustion cycle.

6. The method of claim 5, wherein the predefined window is between the start of ignition timing and an end of main combustion phase timing.

7. The method of claim 6, wherein the end of main combustion phase timing occurs when a cumulative heat release rate reaches a predetermined value.

8. The method of claim 1, wherein the mitigation strategy comprises notifying a diagnostic system of the occurrence of the abnormal combustion characteristic.

9. The method of claim 1, wherein the internal combustion engine is a dual fuel engine operable in a single fuel mode and a dual fuel mode, the method further comprising transitioning to the single fuel mode from the dual fuel mode when the engine knock event is detected.

10. The method of claim 9, wherein the combustion chamber is one of a plurality of combustion chambers, wherein the transition to single fuel mode occurs only for respective combustion chambers experiencing the engine knock event.

11. The method of claim 1, the mitigation strategy comprising:
retarding ignition timing across a first plurality of engine cycles in a step-wise fashion when a knock level is greater than a first threshold during the first plurality of engine cycles, until a preset limit is reached; and
advancing ignition timing across a second plurality of engine cycles in a step-wise fashion when the knock level is less than the first threshold during the second plurality of engine cycles, until the calibrated ignition timing is reached.

12. The method of claim 1, the mitigation strategy comprising changing a proportion of a gaseous fuel compared to a pilot fuel.

13. The method of claim 1, further comprising:
calculating as functions of the in-cylinder pressure signal at least one of a gross indicated mean effective pressure or a start of combustion timing; and
detecting the abnormal combustion characteristic is:
a misfire event when the gross indicated mean effective pressure is less than a predetermined mean effective pressure value; or
a pre-ignition event when the start of combustion timing is advanced of a start of ignition timing.

14. The method of claim 13, wherein when a misfire event is detected, the method further comprises performing at least one fuel system check chosen from:
determining a quantity of gaseous fuel remaining in a storage vessel;
determining a pressure of gaseous fuel in a conduit delivering the gaseous fuel to the internal combustion engine is above a predetermined minimum value; and
determining health of a pressure regulating apparatus between the storage vessel and the internal combustion engine by comparing an input pressure with an output pressure.

15. The method of claim 13, further comprising calculating the predetermined mean effective pressure value as a function of at least one of engine operating conditions chosen from engine load and engine speed.

16. The method of claim 13, wherein the start of ignition timing is equal to one of a sum of a pilot injection timing and an ignition delay, and a spark plug firing event.

17. The method of claim 13, further comprising calculating a heat release signal associated with the combustion cycle as a function of the in-cylinder pressure signal, and calculating the start of combustion timing as a function of the heat release signal.

18. The method of claim 13, wherein when the detected at least one abnormal combustion characteristic is the pre-ignition event or the engine knock event, the mitigation strategy comprises at least one mitigation strategy chosen from:
retarding ignition timing;
increasing an exhaust gas recirculation mass flow rate to dilute a gaseous fuel-air mixture to be burned in the combustion chamber; and
increasing an intake air mass flow rate to dilute the gaseous fuel-air mixture.

19. The method of claim 18, wherein the ignition timing is returned to a calibrated timing after a predetermined time interval or a predetermined number of engine cycles.

20. The method of claim 13, wherein the combustion chamber is one of a plurality of combustion chambers, and the method further comprising performing the mitigation strategy for respective combustion chambers experiencing the abnormal combustion characteristic chosen from the misfire event, the pre-ignition event and the engine knock event.

21. An apparatus for detecting and mitigating abnormal combustion in an internal combustion engine comprising:
an acoustic signal sensor connected with the internal combustion engine for emitting signals representative of vibrational signals associated with combustion;
an electronic controller operatively connected with the acoustic signal sensor and programmed to:
determine an in-cylinder pressure signal as a function of the acoustic signal;
calculate a knock index as a functions of the in-cylinder pressure signal;
detect the abnormal combustion characteristic is:
an engine knock event when the electronic controller determines the knock index is greater than a predetermined knock value, wherein the electronic controller weights abnormal combustion characteristics on a rising edge of the in-cylinder pressure signal more than on a falling edge when calculating the knock index; and perform a mitigation strategy for the detected abnormal combustion characteristics.

22. The apparatus of claim 21, wherein the electronic controller is further programmed to:

calculate as functions of the in-cylinder pressure signal at least one of a gross indicated mean effective pressure and a start of combustion timing; and detect the abnormal combustion characteristic is:

a misfire event when the gross indicated mean effective pressure is less than a predetermined mean effective pressure value; or a pre-ignition event when the start of combustion timing is advanced of a start of ignition timing.

* * * * *

UNITED STATES PATENT AND TRADEMARK OFFICE
CERTIFICATE OF CORRECTION

PATENT NO. : 10,450,970 B2
APPLICATION NO. : 15/568425
DATED : October 22, 2019
INVENTOR(S) : Jian Huang et al.

Page 1 of 1

It is certified that error appears in the above-identified patent and that said Letters Patent is hereby corrected as shown below:

In the Claims

Column 12, Claim 21, Line 61:
"calculate a knock index as a functions of the in-cylinder"
Should be:
--calculate a knock index as a function of the in-cylinder--.

Signed and Sealed this
Second Day of June, 2020

Andrei Iancu
*Director of the United States Patent and Trademark Office*